(12) United States Patent
Kato et al.

(10) Patent No.: US 9,337,509 B2
(45) Date of Patent: May 10, 2016

(54) SOLID ELECTROLYTE MATERIAL, SOLID STATE BATTERY, AND METHOD FOR PRODUCING SOLID ELECTROLYTE MATERIAL

(75) Inventors: Yuki Kato, Susono (JP); Shigenori Hama, Susono (JP); Takamasa Otomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 14/123,153

(22) PCT Filed: Jun. 2, 2011

(86) PCT No.: PCT/JP2011/062714
§ 371 (c)(1),
(2), (4) Date: Dec. 23, 2013

(87) PCT Pub. No.: WO2012/164724
PCT Pub. Date: Dec. 6, 2012

(65) Prior Publication Data
US 2014/0127588 A1 May 8, 2014

(51) Int. Cl.
| | | |
|---|---|---|
| *H01M 6/18* | (2006.01) |
| *H01M 10/0562* | (2010.01) |
| *H01B 1/12* | (2006.01) |
| *H01M 4/62* | (2006.01) |
| *H01M 10/052* | (2010.01) |
| *H01M 2/16* | (2006.01) |
| *H01M 4/13* | (2010.01) |

(52) U.S. Cl.
CPC ............ *H01M 10/0562* (2013.01); *H01B 1/122* (2013.01); *H01M 4/625* (2013.01); *H01M 2/1673* (2013.01); *H01M 4/13* (2013.01); *H01M 10/052* (2013.01); *H01M 2300/0068* (2013.01); *H01M 2300/0088* (2013.01); *H01M 2300/0094* (2013.01)

(58) Field of Classification Search
CPC .................. H01M 2300/0068; H01M 10/0562
See application file for complete search history.

(56) References Cited

U.S. PATENT DOCUMENTS

| | | |
|---|---|---|
| 2004/0038123 A1 | 2/2004 | Hisamitsu et al. |
| 2009/0263724 A1 | 10/2009 | Guyomard et al. |
| 2011/0123868 A1 | 5/2011 | Kawaoka et al. |

FOREIGN PATENT DOCUMENTS

| | | | |
|---|---|---|---|
| CN | 1487612 A | | 4/2004 |
| CN | 101065866 A | | 10/2007 |
| CN | 101911369 A | | 12/2010 |
| JP | A-2001-006674 | | 1/2001 |
| JP | 2007329107 A | * | 12/2007 |
| JP | A-2010-33876 | | 2/2010 |

* cited by examiner

*Primary Examiner* — Jane Rhee
(74) *Attorney, Agent, or Firm* — Oliff PLC

(57) ABSTRACT

A main object of the present invention is to provide a solid electrolyte material having excellent electron conductivity. The present invention solves the problem by providing the solid electrolyte material including: a solid electrolyte particle; and a carbon coating layer formed on a surface of the solid electrolyte particle.

10 Claims, 4 Drawing Sheets

SOLID ELECTROLYTE MATERIAL, SOLID STATE BATTERY, AND METHOD FOR PRODUCING SOLID ELECTROLYTE MATERIAL

TECHNICAL FIELD

The present invention relates to a solid electrolyte material having excellent electron conductivity.

BACKGROUND ART

Along with the recent rapid spread of information-related devices and communication devices such as personal computers, video cameras, and mobile phones, importance has been attached to the development of batteries used as their power sources. Also in the automobile industry, development of high-power and high-capacity batteries for electric cars or hybrid cars is proceeding. Among various batteries, lithium batteries are now attracting attention for their high energy density.

Lithium batteries now commercially available use a liquid electrolyte containing a flammable organic solvent, and therefore it is necessary to install a safety device for suppressing temperature rise in the event of a short circuit or to improve their structure and materials to prevent a short circuit. On the other hand, it is considered that an all-solid-state lithium battery obtained by replacing a liquid electrolyte with a solid electrolyte layer is excellent in production cost and productivity, because a flammable organic solvent is not used in the battery and therefore a safety device can be simplified.

Such a solid state battery usually includes a cathode active material layer, an anode active material layer, and a solid electrolyte layer formed between the cathode active material layer and the anode active material layer. Further, the electrode active material layer (cathode active material layer and anode active material layer) is a layer which contains at least an active material, and may further contain a conductive material that improves electron conductivity and a solid electrolyte material that improves ion conductivity.

Patent Literature 1 discloses an electron-lithium ion mixed conductor using a transition metal sulfide represented by MeS (Me is a metal element mainly containing one or more transition metal elements), lithium sulfide, and silicon sulfide. According to this technique, a raw material (lithium sulfide, silicon sulfide, and the like) of a lithium ion conductor is doped with a transition metal sulfide to improve electron conductivity.

CITATION LIST

Patent Literature

Patent Literature 1: Japanese Patent Application Laid-Open (JP-A) No. 2001-006674

SUMMARY OF INVENTION

Technical Problem

From the viewpoint of improving the performance of a solid state battery, a solid electrolyte material contained in an electrode active material layer is required to have not only ion conductivity but also excellent electron conductivity. Under the circumstances, a main object of the present invention is to provide a solid electrolyte material having excellent electron conductivity.

Solution to Problem

In order to achieve the above object, the present invention provides a solid electrolyte material comprising: a solid electrolyte particle; and a carbon coating layer formed on a surface of the solid electrolyte particle.

According to the present invention, a carbon coating layer is provided on the surface of a solid electrolyte particle, which makes it possible to provide a solid electrolyte material having excellent electron conductivity.

In the present invention, the carbon coating layer is preferably a layer with no grain boundary. The reason therefor is to further improve electron conductivity.

In the present invention, the carbon coating layer is preferably formed by carbonizing a liquid component.

In the present invention, the solid electrolyte particle is preferably a sulfide solid electrolyte particle. This is because the sulfide solid electrolyte particle has excellent ion conductivity.

In the present invention, an electron conductivity of the solid electrolyte material is preferably $1 \times 10^{-3}$ S/cm or higher.

The present invention also provides a solid state battery comprising: a cathode active material layer; an anode active material layer; and a solid electrolyte layer formed between the cathode active material layer and the anode active material layer, characterized in that at least one of the cathode active material layer and the anode active material layer contains the above-mentioned solid electrolyte material.

According to the present invention, at least one of a cathode active material layer and an anode active material layer contains the above-mentioned solid electrolyte material, which makes it possible to provide a high-performance solid state battery.

The present invention also provides a method for producing a solid electrolyte material comprising steps of: a preparing step of preparing a solid electrolyte particle having a liquid component on its surface; and a heating step of heating the solid electrolyte particle to carbonize the liquid component to form a carbon coating layer.

According to the present invention, a solid electrolyte material having excellent electron conductivity can be obtained by performing the heating step of forming the carbon coating layer on the surface of the solid electrolyte particle. Further, a carbon coating layer having high coating uniformity can be obtained by carbonizing a liquid component present on the surface of the solid electrolyte particle.

Advantageous Effects of Invention

The present invention produces the effect such as to allow a solid electrolyte material having excellent electron conductivity.

DESCRIPTION OF EMBODIMENTS

Hereinafter, a solid electrolyte material, a solid state battery, and a method for producing a solid electrolyte material of the present invention will be described in detail.

A. Solid Electrolyte Material

The solid electrolyte material of the present invention comprises a solid electrolyte particle and a carbon coating layer formed on the surface of the solid electrolyte particle.

Figure 1:
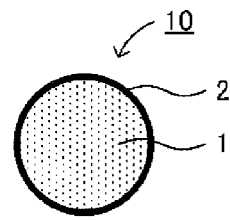
FIG. 1 is a schematic cross-sectional view showing an example of a solid electrolyte material of the present invention.

FIG. 1 is a schematic cross-sectional view showing an example of the solid electrolyte material of the present invention. The solid electrolyte material 10 shown in FIG. 1 comprises a solid electrolyte particle 1 and a carbon coating layer 2 formed on the surface of the solid electrolyte particle 1. It is to be noted that the solid electrolyte particle 1 shown in FIG. 1 is a primary particle, but the solid electrolyte particle according to the present invention may be a secondary particle.

According to the present invention, the carbon coating layer is provided on the surface of the solid electrolyte particle, which makes it possible to provide the solid electrolyte material having excellent electron conductivity. Therefore, excellent electron-conductive path (and ion-conductive path) can be formed by using the solid electrolyte material of the present invention in an electrode active material layer, which makes it possible to increase the power and capacity of a battery. The above-mentioned Patent Literature 1 discloses an electron-lithium ion mixed conductor doped with a transition metal sulfide. However, this electron-lithium ion mixed conductor contains a transition metal, and therefore there is a possibility that oxidation-reduction occurs at a certain electrical potential so that capacity degradation is caused. On the other hand, the solid electrolyte material of the present invention does not need to use a transition metal, and therefore has the advantage that capacity degradation can be suppressed. Further, the solid electrolyte material of the present invention has excellent electron conductivity, and therefore has the advantages that the amount of a conductive material used in an electrode active material layer can be reduced and an electrode active material whose electron conductivity is extremely low can also be used.

Hereinafter, each of the components of the solid electrolyte material of the present invention will be described.

1. Solid Electrolyte Particle

The solid electrolyte particle according to the present invention is not particularly limited as long as the solid electrolyte particle has ion conductivity. Examples of the solid electrolyte particle include inorganic solid electrolyte particles such as a sulfide solid electrolyte particle, an oxide solid electrolyte particle, and a nitride solid electrolyte particle. The sulfide solid electrolyte particle is preferred in that its ion conductivity is higher than that of the oxide solid electrolyte particle, and the oxide solid electrolyte particle is preferred in that its chemical stability is higher than that of the sulfide solid electrolyte particle. Alternatively, the solid electrolyte particle according to the present invention may be an inorganic solid electrolyte particle containing a halogen.

The sulfide solid electrolyte particle usually contains a metal element (M) that becomes a conductive ion and sulfur (S). Examples of the metal element M include Li, Na, K, Mg, and Ca. Among them, Li is preferred. Particularly, the sulfide solid electrolyte particle preferably contains Li, A (A is at least one selected from the group consisting of P, Si, Ge, Al, and B), and S. Further, the sulfide solid electrolyte particle may contain a halogen such as Cl, Br, and I. By containing the halogen, ion conductivity can be improved. Further, the sulfide solid electrolyte particle may contain O. By containing O, chemical stability can be improved.

Examples of the sulfide solid electrolyte particle having Li ion conductivity include $Li_2S—P_2S_5$, $Li_2S—P_2S_5—LiI$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2B_3$, $Li_2S—P_2S_5—Z_mS_n$ (where m and n are positive numbers and Z is any one of Ge, Zn, and Ga), $Li_2S—GeS_2$, $Li_2S—SiS_2—Li_3PO_4$, and $Li_2S—SiS_2—Li_xMO_y$ (where x and y are positive numbers and M is any one of P, Si, Ge, B, Al, Ga, and In). It is to be noted that the above-mentioned term "$Li_2S—P_2S_5$" refers to a sulfide solid electrolyte particle formed using a raw material composition containing $Li_2S$ and $P_2S_5$, and the same goes for the other terms.

Further, it is preferred that the sulfide solid electrolyte particle contains substantially no $Li_2S$. This is because the sulfide solid electrolyte particle having high chemical stability can be obtained. $Li_2S$ reacts with water to generate hydrogen sulfide. For example, when the $Li_2S$ content of the raw material composition is high, $Li_2S$ is likely to remain. The fact that "the sulfide solid electrolyte particle contains substantially no $Li_2S$" can be confirmed by X-ray diffraction. Specifically, when there is no peak of $Li_2S$ ($2\theta=27.0°$, $31.2°$, $44.8°$, $53.1°$), it can be determined that the sulfide solid electrolyte particle contains substantially no $Li_2S$.

Further, it is preferred that the sulfide solid electrolyte particle contains substantially no cross-linking sulfur. This is because the sulfide solid electrolyte particle having high chemical stability can be obtained. The "cross-linking sulfur" refers to cross-linking sulfur in a compound formed by reacting $Li_2S$ and a sulfide of the above-mentioned A. For example, cross-linking sulfur in an $S_3P—S—PS_3$ structure formed by reacting $Li_2S$ and $P_2S_5$ corresponds to the "cross-linking sulfur". Such cross-linking sulfur is likely to react with water and is likely to generate hydrogen sulfide. Further, the fact that "the sulfide solid electrolyte particle contains substantially no cross-linking sulfur" can be confirmed by measuring the Raman spectrum. For example, in the case of an $Li_2S—P_2S_5$-based sulfide solid electrolyte particle, the peak of an $S_3P—S—PS_3$ structure usually appears at 402 $cm^{-1}$. Therefore, it is preferred that this peak is not detected. Further, the peak of a $PS_4^{3-}$ structure usually appears at 417 $cm^{-1}$. In the present invention, an intensity $I_{402}$ at 402 $cm^{-1}$ is preferably lower than an intensity $I_{417}$ at 417 $cm^{-1}$. More specifically, the intensity $I_{402}$ is, for example, preferably 70% or lower, more preferably 50% or lower, even more preferably 35% or lower with respect to the intensity $I_{417}$.

Further, when the sulfide solid electrolyte particle is formed using a raw material composition containing $Li_2S$ and $P_2S_5$, the ratio of $Li_2S$ with respect to the total of $Li_2S$ and $P_2S_5$ is, for example, preferably within a range of 70 mol % to 80 mol %, more preferably within a range of 72 mol % to 78 mol %, even more preferably within a range of 74 mol % to 76 mol %. This is because the sulfide solid electrolyte particle having an ortho-composition or a composition close to the ortho-composition can be obtained and the sulfide solid electrolyte particle having high chemical stability can be obtained. Here, the "ortho" generally refers to an oxoacids having the highest hydration degree among oxoacids obtained by hydration of the same oxide. In the present invention, the "ortho-composition" refers to a crystal composition to which $Li_2S$ is most added among sulfides. $Li_3PS_4$ corresponds to an ortho-composition in an $Li_2S$—$P_2S_5$-based sulfide solid electrolyte particle. In the case of an $Li_2S$—$P_2S_5$-based sulfide solid electrolyte particle, the ratio between $Li_2S$ and $P_2S_5$ for obtaining an ortho-composition is $Li_2S:P_2S_5=75:25$ on a molar basis. It is to be noted that also when $Al_2S_3$ or $B_2S_3$ is used instead of $P_2S_5$ contained in the above-mentioned raw material composition, a preferred range is the same as the range described above. $Li_3AlS_3$ corresponds to an ortho-composition in an $Li_2S$—$Al_2S_3$-based sulfide solid electrolyte particle, and $Li_3BS_3$ corresponds to an ortho-composition in an $Li_2S$—$B_2S_3$-based sulfide solid electrolyte particle.

Further, when the sulfide solid electrolyte particle is formed using a raw material composition containing $Li_2S$ and $SiS_2$, the ratio of $Li_2S$ to the total of $Li_2S$ and $SiS_2$ is, for example, preferably within a range of 60 mol % to 72 mol %, more preferably within a range of 62 mol % to 70 mol %, even more preferably within a range of 64 mol % to 68 mol %. This is because the sulfide solid electrolyte particle having an ortho-composition or a composition close to the ortho-composition can be obtained and the sulfide solid electrolyte particle having high chemical stability can be obtained. $Li_4SiS_4$ corresponds to an ortho-composition in an $Li_2S$—$SiS_2$-based sulfide solid electrolyte particle. In the case of an $Li_2S$—$SiS_2$-based sulfide solid electrolyte particle, the ratio of $Li_2S$ and $SiS_2$ for obtaining an ortho-composition is $Li_2S:SiS_2=66.6:33.3$ on a molar basis. It is to be noted that also when $GeS_2$ is used instead of $SiS_2$ contained in the above-mentioned raw material composition, a preferred range is the same as the range described above. $Li_4GeS_4$ corresponds to an ortho-composition in an $Li_2S$—$GeS_2$-based sulfide solid electrolyte particle.

Further, when the sulfide solid electrolyte particle is formed using a raw material composition containing LiX (X=Cl, Br, I), the ratio of LiX to the raw material composition is, for example, preferably within a range of 1 mol % to 60 mol %, more preferably within a range of 5 mol % to 50 mol %, even more preferably within a range of 10 mol % to 40 mol %. Further, when the sulfide solid electrolyte particle is formed using a raw material composition containing $Li_2O$, the ratio of $Li_2O$ to the raw material composition is, for example, preferably within a range of 1 mol % to 25 mol %, more preferably within a range of 3 mol % to 15 mol %.

Alternatively, the sulfide solid electrolyte particle may be sulfide glass, crystallized sulfide glass, or a crystalline material obtained by a solid phase method.

On the other hand, examples of the oxide solid electrolyte particle having Li ion conductivity include a compound having a NASICON type structure and the like. One example of the compound having a NASICON type structure is a compound represented by the general formula: $Li_{1+x}Al_xGe_{2-x}(PO_4)_3$ ($0 \le x \le 2$). Particularly, the oxide solid electrolyte particle is preferably $Li_{1.5}Al_{0.5}Ge_{1.5}(PO_4)_3$. Another example of the compound having a NASICON type structure is a compound represented by the general formula: $Li_{1+x}Al_xGe_{2-x}(PO_4)_3$ ($0 \le x \le 2$). Particularly, the oxide solid electrolyte particle is preferably $Li_{1.5}Al_{0.5}Ti_{1.5}(PO_4)_3$. Other examples of the oxide solid electrolyte particle include LiLaTiO (e.g., $Li_{0.34}La_{0.51}TiO_3$), LiPON (e.g., $Li_{29}PO_{3.3}N_{0.46}$), and LiLaZrO (e.g., $Li_7La_3Zr_2O_{12}$).

The average particle diameter ($D_{50}$) of the solid electrolyte particles is, for example, preferably within a range of 1 nm to 100 μm, particularly preferably within a range of 10 nm to 30 μm. The solid electrolyte particle according to the present invention usually has low electron conductivity, and has an electron conductivity of, for example, $1 \times 10^{-7}$ S/cm or lower at ordinary temperature.

2. Carbon Coating Layer

Hereinafter, the carbon coating layer according to the present invention will be described. The carbon coating layer according to the present invention is formed on the surface of the above-mentioned solid electrolyte particle. The carbon coating layer is not particularly limited as long as the layer contains carbon, but preferably is a layer with no grain boundary. This is because electron conductivity is further improved. The fact that the carbon coating layer is a layer with no grain boundary can be confirmed by, for example, observation with a transmission electron microscope (TEM). Further, the carbon coating layer having no grain boundary can be obtained by, for example, carbonizing a liquid component that will be described later. That is, the carbon coating layer according to the present invention is preferably obtained by carbonizing a liquid component.

The thickness of the carbon coating layer is not particularly limited, but is, for example, preferably 10 nm or more, more preferably 20 nm or more, even more preferably 50 nm or more. This is because if the carbon coating layer is too thin, there is a possibility that electron conductivity cannot be sufficiently improved. On the other hand, the thickness of the carbon coating layer is, for example, preferably 200 nm or less, more preferably 100 nm or less. This is because if the carbon coating layer is too thick, there is a possibility that ion conductivity is inhibited. It is to be noted that the thickness of the carbon coating layer can be determined using a transmission electron microscope (TEM).

The surface coverage of the solid electrolyte particle with the carbon coating layer is, for example, preferably 40% or higher, more preferably 60% or higher, and is preferably within a range of 60% to 80%. The surface coverage with the carbon coating layer can be determined by X-ray photoelectron spectroscopy (XPS). It is to be noted that even when the surface coverage with the carbon coating layer is 100%, ion conductivity is less likely to be inhibited because the carbon coating layer is thin.

3. Solid Electrolyte Material

The solid electrolyte material of the present invention comprises the above-mentioned solid electrolyte particle and the above-mentioned carbon coating layer. The electron conductivity of the solid electrolyte material of the present invention is preferably higher. The electron conductivity of the solid electrolyte material at ordinary temperature is preferably $1 \times 10^{-5}$ S/cm or higher, more preferably $1 \times 10^{-4}$ S/cm or higher, even more preferably $1 \times 10^{-3}$ S/cm or higher. It is to be noted that, as will be described later with reference to Example, the electron conductivity can be determined by current measurement performed by applying a direct current. Further, the solid electrolyte material of the present invention can be used for any purpose requiring ion conductivity and electron conductivity, but is particularly preferably used for an electrode active material layer of a battery.

B. Solid State Battery

Hereinafter, the solid state battery of the present invention will be described. The solid state battery of the present invention comprises a cathode active material layer, an anode active material layer, and a solid electrolyte layer formed between the cathode active material layer and the anode active material layer, characterized in that at least one of the cathode active material layer and the anode active material layer contains the above-mentioned solid electrolyte material.

Figure 2:
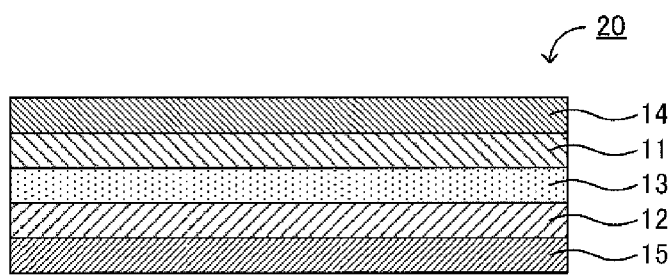
FIG. 2 is a schematic cross-sectional view showing an example of a solid state battery of the present invention.

FIG. 2 is a schematic cross-sectional view showing an example of the solid state battery of the present invention. The solid state battery 20 shown in FIG. 2 comprises a cathode active material layer 11, an anode active material layer 12, a solid electrolyte layer 13 formed between the cathode active material layer 11 and the anode active material layer 12, a cathode current collector 14 that collects current from the cathode active material layer 11, and an anode current collector 15 that collects current from the anode active material layer 12. In the present invention, the main characteristic is that at least one of the cathode active material layer 11 and the anode active material layer 12 contains the solid electrolyte material described in the above-mentioned "A. Solid electrolyte material".

According to the present invention, at least one of a cathode active material layer and an anode active material layer contains the above-mentioned solid electrolyte material, which makes it possible to provide a high-performance solid state battery. Specifically, a highly electron-conductive path and a highly ion-conductive path can be formed in an electrode active material by using the above-mentioned solid electrolyte material, which makes it possible to increase the power and capacity of a battery.

Hereinafter, each of the components of the solid state battery of the present invention will be described.

1. Cathode Active Material Layer

The cathode active material layer according to the present invention is a layer containing at least a cathode active material, and if necessary, may further contain at least one of a solid electrolyte material, a conductive material, and a binder. The type of the cathode active material is appropriately selected depending on the type of the solid state battery, and examples of the cathode active material include an oxide active material and a sulfide active material. Examples of a cathode active material for use in lithium solid state batteries include: layered cathode active materials such as $LiCoO_2$, $LiNiO_2$, $LiCo_{1/3}Ni_{1/3}Mn_{1/3}O_2$, $LiVO_2$, and $LiCrO_2$; spinel type cathode active materials such as $LiMn_2O_4$, $Li(Ni_{0.25}Mn_{0.75})_2O_4$, $LiCoMnO_4$, and $Li_2NiMn_3O_8$; olivine type cathode active materials such as $LiCoPO_4$, $LiMnPO_4$, and $LiFePO_4$; and NASICON type cathode active materials such as $Li_3V_2P_3O_{12}$.

Example of the shape of the cathode active material includes, for example, particulate. The average particle diameter ($D_{50}$) of the cathode active material is, for example, preferably within a range of 1 nm to 100 μm, more preferably within a range of 10 nm to 30 μm. Further, the cathode active material content in the cathode active material layer is not particularly limited, but is preferably within a range of, for example, 40 wt % to 99 wt %.

The cathode active material layer may contain a solid electrolyte material. By adding a solid electrolyte material, the ion conductivity of the cathode active material layer can be improved. Particularly, in the present invention, the cathode active material layer preferably contains the solid electrolyte material described in the above-mentioned "A. Solid electrolyte material". Alternatively, the cathode active material layer may contain, as a solid electrolyte material, the solid electrolyte particles (particles having no carbon coating layer) described in the above-mentioned "A. Solid electrolyte material". The solid electrolyte material content in the cathode active material layer is not particularly limited, but is preferably within a range of, for example, 10 wt % to 90 wt %.

The cathode active material layer may contain a conductive material. By adding a conductive material, the electron conductivity of the cathode active material layer can be improved. Examples of the conductive material include acetylene black, ketjen black, and carbon fiber. The cathode active material layer preferably contains a binder. This is because the cathode active material layer having excellent flexibility can be obtained. Examples of the binder include fluorine-containing binders such as PTFE and PVDF. The thickness of the cathode active material layer is, for example, preferably within a range of 0.1 μm to 1000 μm, more preferably within a range of 1 μm to 100 μm.

2. Anode Active Material Layer

The anode active material layer according to the present invention is a layer containing at least an anode active material, and if necessary, may further contain at least one of a solid electrolyte material, a conductive material, and a binder. The type of the anode active material is not particularly limited, and examples of the anode active material include a carbon active material, an oxide active material, and a metal active material. Examples of the carbon active material include mesocarbon microbeads (MCMB), highly-oriented graphite (HOPG), hard carbon, and soft carbon. Examples of the oxide active material include $Nb_2O_5$, $Li_4Ti_5O_{12}$, and SiO. Examples of the metal active material include In, Al, Si, and Sn.

Example of the shape of the anode active material includes, for example, particulate. The average particle diameter ($D_{50}$) of the anode active material is, for example, preferably within a range of 1 nm to 100 μm, more preferably within a range of 10 nm to 30 μm. Further, the anode active material content in the anode active material layer is not particularly limited, but is preferably within a range of, for example, 40 wt % to 99 wt %.

The anode active material layer may contain a solid electrolyte material. By adding a solid electrolyte material, the ion conductivity of the anode active material layer can be improved. Particularly, in the present invention, the anode active material layer preferably contains the solid electrolyte material described in the above-mentioned "A. Solid electrolyte material". Alternatively, the anode active material layer may contain, as a solid electrolyte material, the solid electrolyte particles (particles having no carbon coating layer) described in the above-mentioned "A. Solid electrolyte material". It is to be noted that the conductive material and the binder for use in the anode active material layer are the same as those described in the above-mentioned "1. Cathode active material layer", and therefore the description thereof will not be repeated. Further, the thickness of the anode active material layer is, for example, preferably within a range of 0.1 μm to 1000 μm, more preferably within a range of 1 μm to 100 μm.

3. Solid Electrolyte Layer

The solid electrolyte layer according to the present invention is a layer containing at least a solid electrolyte. The solid electrolyte is not particularly limited as long as the solid electrolyte has ion conductivity, and may be, for example, the solid electrolyte particles (particles having no carbon coating layer) described in the above-mentioned "A. Solid electrolyte material". The solid electrolyte content in the solid electrolyte layer is, for example, preferably 60 wt % or higher, more preferably 70 wt % or higher, particularly preferably 80 wt % or higher. The solid electrolyte layer may contain a binder or may be composed of only the solid electrolyte. The thickness of the solid electrolyte layer widely varies depending on the structure of the battery, but is, for example, preferably within a range of 0.1 μm to 1000 μm, more preferably within a range of 1 μm to 100 μm.

4. Other Components

The solid state battery of the present invention may further include a cathode current collector that collects current from the cathode active material layer and an anode current collector that collects current from the anode active material layer. Examples of a material of the cathode current collector include SUS, aluminum, nickel, iron, titanium, and carbon. Examples of a material of the anode current collector include SUS, copper, nickel, and carbon. Further, for a battery case used in the present invention, one commonly used for solid state batteries may be used. An example of such a battery case includes a SUS battery case.

5. Solid State Battery

Examples of the solid state battery of the present invention include a lithium solid state battery, a sodium solid state battery, a potassium solid state battery, a magnesium solid state battery, and a calcium solid state battery. Among them, a lithium solid state battery is preferred. Further, the solid state battery of the present invention may be either a primary battery or a secondary battery, but is preferably the latter. This is because a secondary battery can be repeatedly charged and discharged, and is useful as, for example, an in-vehicle battery. Examples of the shape of the solid state battery include, for example, a coin type, a laminated type, a cylindrical type, or a rectangular type. Further, a method for producing the solid state battery is not particularly limited as long as the above-mentioned solid state battery can be obtained, and the same method may be used as a method for producing a common solid state battery.

C. Method for Producing Solid Electrolyte Material

Hereinafter, the method for producing a solid electrolyte material of the present invention will be described. The method for producing a solid electrolyte material of the present invention comprises the steps of: a preparing step of preparing a solid electrolyte particle having a liquid component on its surface; and a heating step of heating the solid electrolyte particle to carbonize the liquid component to form a carbon coating layer.

Figure 3A:
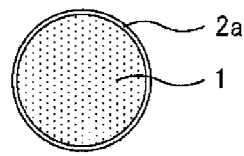
FIG. 3 is a schematic cross-sectional view showing an example of a method for producing a solid electrolyte material of the present invention.
Figure 3B:
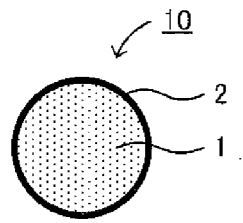
Figure 4A:
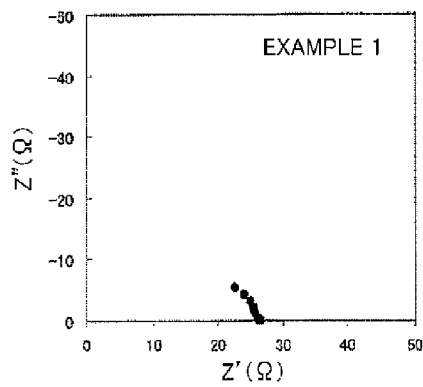
FIG. 4 is a result of measuring impedance performed on solid electrolyte materials obtained in Example 1 and Comparative Examples 1 to 3.
Figure 4C:
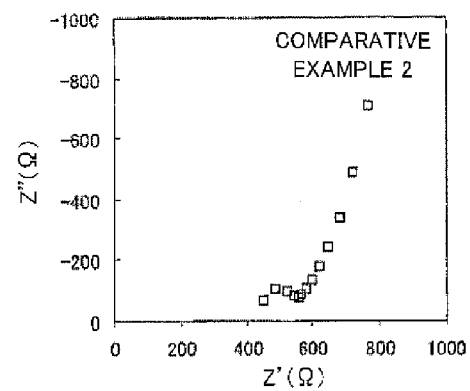
Figure 4B:
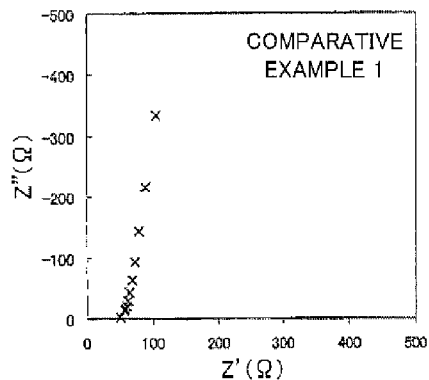
Figure 4D:
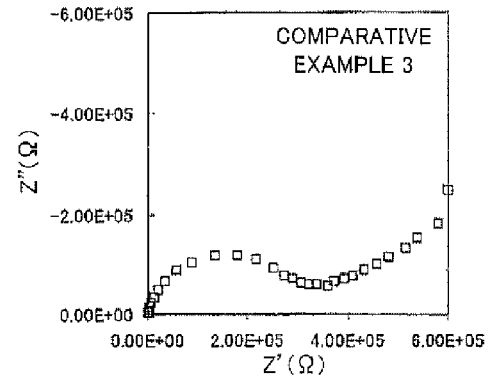

FIG. 3 is a schematic cross-sectional view showing an example of the method for producing a solid electrolyte material of the present invention. As shown in FIG. 3, a solid electrolyte particle 1 having a liquid component 2a on its surface is first prepared (FIG. 3A). As will be described later, such a solid electrolyte particle 1 can be obtained by, for example, immersing a solid electrolyte particle in a liquid component. Then, the solid electrolyte particle 1 is heated to carbonize the liquid component 2a on the surface of the solid electrolyte particle 1 to form a carbon coating layer 2 (FIG. 3B). In this way, a solid electrolyte material 10 is obtained.

According to the present invention, a solid electrolyte material having excellent electron conductivity can be obtained by performing the heating step of forming a carbon coating layer on the surface of the solid electrolyte particle. Further, a carbon coating layer having high coating uniformity can be obtained by carbonizing a liquid component present on the surface of a solid electrolyte particle.

Hereinafter, each of the steps of the method for producing a solid electrolyte material of the present invention will be described.

1. Preparing Step

The preparing step according to the present invention is the step of preparing a solid electrolyte particle having a liquid component on its surface.

The solid electrolyte particle according to the present invention is the same as that described in the above-mentioned "A. Solid electrolyte material", and therefore the description thereof will not be repeated. Further, the liquid component according to the present invention is not particularly limited as long as a carbon coating layer can be formed by carbonization. It is to be noted that in the present invention, a liquid as a carbon source for a carbon coating layer is sometimes simply referred to as a "liquid". Further, the liquid present on the surface of the solid electrolyte particle is referred to as a liquid component. The liquid is preferably one that does not react with the solid electrolyte particle. This is because the solid electrolyte particle can be prevented from being deteriorated. For example, when the solid electrolyte particle is a sulfide solid electrolyte particle, the liquid is preferably an aprotic liquid.

Further, the liquid is preferably a hydrocarbon, more preferably an alkane. This is because a carbon coating layer having a low impurity content can be obtained. The alkane may be either a chain alkane or a cyclic alkane. The number of carbon atoms in the chain alkane is preferably, for example, 5 or more. Further, the upper limit of the number of carbon atoms in the chain alkane is not particularly limited as long as the chain alkane is liquid at ordinary temperature. Specific examples of the chain alkane include pentane, hexane, heptane, octane, nonane, decane, undecane, dodecane, and paraffin. It is to be noted that the chain alkane may be branched. On the other hand, the number of carbon atoms in the cyclic alkane is preferably, for example, 5 or more. Further, the upper limit of the number of carbon atoms in the cyclic alkane is not particularly limited as long as the cyclic alkane is liquid at ordinary temperature. Specific examples of the cyclic alkane include cyclopentane, cyclohexane, cycloheptane, cyclooctane, and cycloparaffin.

Another example of the hydrocarbon includes an aromatic hydrocarbon. Examples of the aromatic hydrocarbon include benzene, toluene, and xylene.

Further, the liquid preferably has a low water content. This is because the solid electrolyte particle (especially, sulfide solid electrolyte particle) can be prevented from being deteriorated. The water content of the liquid is, for example, preferably 100 ppm or lower, more preferably 50 ppm or lower.

Hereinafter, a preparation method for preparing a solid electrolyte particle having a liquid component on its surface will be described. One example of the preparation method includes a method in which a solid electrolyte particle is brought into contact with the liquid. Specific examples of such a method include a method in which a solid electrolyte particle is immersed in the liquid and a method in which the liquid is applied or sprayed onto a solid electrolyte particle. Further, liquid removal treatment (e.g., filtration, drying) may be performed after a solid electrolyte particle is brought into contact with the liquid to remove the unnecessary liquid.

Another example of the preparation method for preparing a solid electrolyte particle having a liquid component on its surface includes a method in which the liquid is mixed during the synthesis of a solid electrolyte particle. A specific example of such a method includes a method in which the liquid is added to a raw material composition of the solid electrolyte particles, and mechanical milling is performed. This makes it possible to obtain amorphized solid electrolyte particles (e.g., sulfide glass). Further, by adding the liquid to the raw material composition, there also is the advantage that the formation of deposit on the inner surface of a pot of a mechanical milling machine can be prevented so that more uniform amorphization can be achieved. The mechanical milling is not particularly limited as long as it is a method in which the raw material composition is mixed while applying mechanical energy thereto, and examples thereof include ball milling, vibration milling, turbo milling, mechanofusion, and disc milling. Among them, ball milling is preferred, and planetary ball milling is particularly preferred.

Further, various conditions for the mechanical milling are set so that desired solid electrolyte particles can be obtained. For example, when a planetary ball mill is used, a raw material composition and grinding balls are added, and processing is performed at a predetermined rotation number for a predetermined time. In general, the larger the rotation number, the faster the generation speed of solid electrolyte particles, and the longer the processing time, the higher the conversion rate from the raw material composition to the solid electrolyte particles. The disc rotation number at which planetary ball milling is performed is, for example, preferably within a range of 200 rpm to 500 rpm, particularly preferably within a range of 250 rpm to 400 rpm. Further, the processing time during which planetary ball milling is performed is, for example, preferably within a range of 1 hour to 100 hours, particularly preferably within a range of 1 hour to 50 hours. Further, liquid removal treatment (e.g., filtration, drying) may be performed after the mechanical milling to remove the unnecessary liquid.

2. Heating Step

Hereinafter, the heating step according to the present invention will be described. The heating step according to the present invention is the step of heating the solid electrolyte particle to carbonize the liquid component to form a carbon coating layer.

The temperature of heating is not particularly limited as long as it is equal to or higher than a temperature at which the liquid component is carbonized. The temperature at which the liquid component is carbonized varies depending on the type of the liquid component, but can be easily determined by preliminary experiment. As will be described later, whether carbonization has occurred or not can be confirmed by XPS. The heating temperature is, for example, within a range of 400° C. to 1000° C., preferably within a range of 500° C. to 900° C. For example, when the liquid component is heptane, it has been confirmed that carbonization starts at about 600° C. Therefore, when heptane is used, heating is preferably performed to achieve a temperature of 600° C. or higher. On the other hand, if the heating temperature is too high, there is a possibility that an unnecessary side reaction occurs. For example, in the case of a Li-containing solid electrolyte particle, the heating temperature is preferably 900° C. or lower, because if the heating temperature exceeds 900° C., a reaction between Li and a quartz tube starts.

The time of heating is not particularly limited as long as a desired carbon coating layer can be obtained, but is, for example, preferably within a range of 30 minutes to 50 hours, more preferably within a range of 50 minutes to 24 hours. This is because if the processing time is too short, there is a possibility that carbonization is not satisfactorily performed, and if the processing time is too long, there is a possibility that the effect is not further enhanced and productivity is reduced. Further, the atmosphere in which heating is performed is not particularly limited as long as the liquid component can be carbonized, but is preferably a vacuum or an inert gas atmosphere. This is because the liquid component can be prevented from being oxidized. Further, the method of heating is not particularly limited, and may be, for example, a method using a burning furnace.

The present invention is not limited to the above-mentioned embodiments. The above-mentioned embodiments are exemplification, and any is included in the technical scope of the present invention if it has substantially the same constitution as the technical idea described in the claims of the present invention and offers similar operation and effect thereto.

EXAMPLES

Hereinafter, the present invention will be described more specifically with reference to the following example.

Example 1

As starting materials, lithium sulfide ($Li_2S$) and phosphorus pentasulfide ($P_2S_5$) were used. Then, $Li_2S$ and $P_2S_5$ were weighed in a glove box under an atmosphere of Ar (dew point: −70° C.) so that the molar ratio was $75Li_2S \cdot 25P_2S_5$ ($Li_3PS_4$, ortho-composition). Then, 2 g of a mixture of them was mixed in an agate mortar for 5 minutes. Then, 2 g of the obtained mixture was introduced into a pot (45 cc, made of $ZrO_2$) of a planetary ball mill, 4 g of dehydrated heptane (water content: 30 ppm or less) was introduced, 53 g of $ZrO_2$ balls ($\phi$=5 mm) were further introduced, and the pot was completely hermetically sealed (Ar atmosphere). The pot was attached to the planetary ball mill (P7 manufactured by FRITSCH) to perform mechanical milling at a disc rotation number of 500 rpm for 40 hours. Then, the obtained sample was dried at 150° C. to obtain $75Li_2S \cdot 25P_2S_5$ glass (sulfide solid electrolyte particles). Then, the obtained $75Li_2S \cdot 25P_2S_5$ glass was heated to 700° C. in a vacuum to carbonize the heptane remaining on the surface. In this way, a solid electrolyte material of the present invention was obtained.

Comparative Example 1

The $75Li_2S \cdot 25P_2S_5$ glass (sulfide solid electrolyte particles) obtained in Example 1 was used as a comparative solid electrolyte material.

Comparative Example 2

A solid electrolyte material was obtained in the same manner as in Example 1 except that the $75Li_2S \cdot 25P_2S_5$ glass was heated to 260° C. in a vacuum, instead of heating to 700° C. in a vacuum.

Comparative Example 3

A solid electrolyte material was obtained in the same manner as in Example 1 except that the dehydrated heptane was not used.

[Evaluations]

(Impedance Measurement, Current Measurement)

Impedance measurement was performed on the solid electrolyte materials obtained in Example 1 and Comparative Examples 1 to 3. First, 100 mg of the sample was placed in a support tube manufactured by MACOR, and both surfaces of the sample were sandwiched between two electrodes manufactured by SKD and was compressed at a pressure of 4.3 ton/cm$^2$. Then, AC impedance measurement was performed while confining pressure was applied to the sample. The measurement was performed using an impedance analyzer (Model 1260 manufactured by Solartron) at an applied voltage of 5 mV in a measuring frequency range of 0.01 MHz to 1 MHz. The results are shown in FIG. 4. As shown in FIG. 4, diffusion was found in a cole-cole plot in Comparative Examples 1 to 3, but diffusion was not found in a cole-cole plot in Example 1. By these results, it is suggested that the solid electrolyte material obtained in Example 1 had high electron conductivity.

Figure 5:
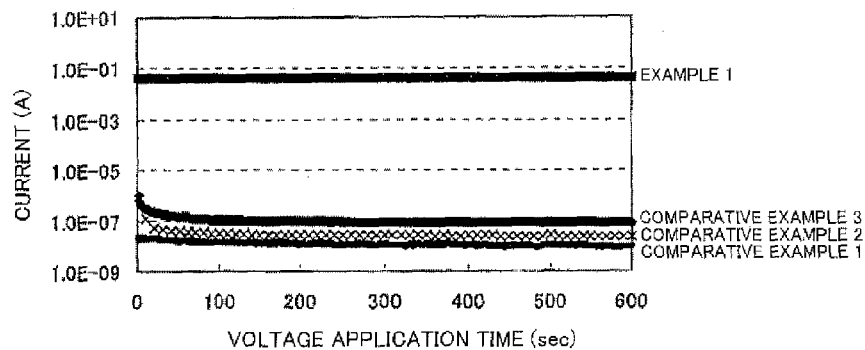
FIG. 5 is a result of measuring current performed on the solid electrolyte materials obtained in Example 1 and Comparative Examples 1 to 3.
Figure 6:
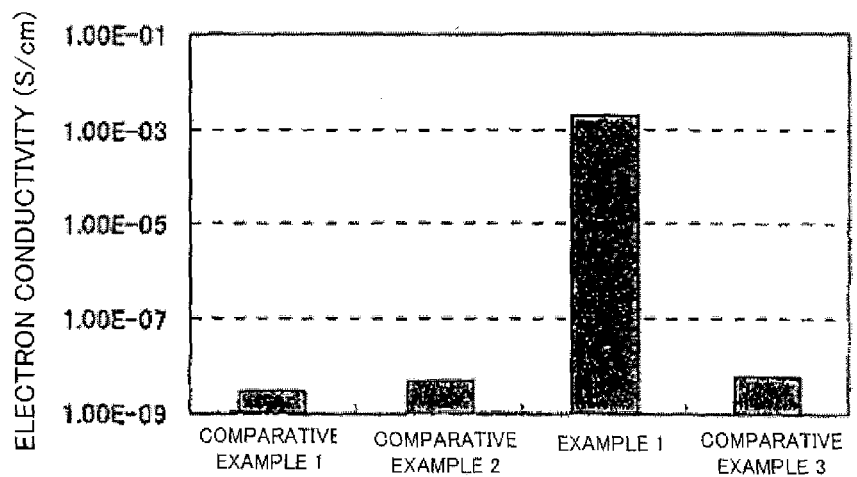
FIG. 6 is a result of electron conductivity of the solid electrolyte materials obtained in Example 1 and Comparative Examples 1 to 3.

Further, current measurement was performed on the pressed samples by applying a direct current to determine electron conductivity at ordinary temperature. The results are shown in FIG. 5 and FIG. 6. As shown in FIG. 5 and FIG. 6, it was confirmed that the solid electrolyte material obtained in Example 1 had high electron conductivity (an electron conductivity of $1\times10^{-3}$ S/cm or higher).

(XPS Measurement)

Figure 7:
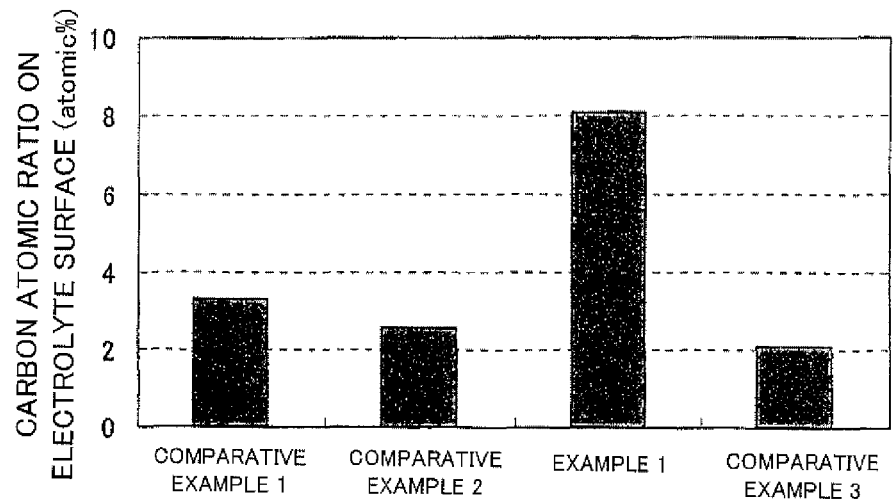
FIG. 7 is a result of measuring XPS performed on the solid electrolyte materials obtained in Example 1 and Comparative Examples 1 to 3.

XPS (X-ray photoelectron spectroscopy) measurement was performed on the solid electrolyte materials obtained in Example 1 and Comparative Examples 1 to 3 to determine the carbon atomic ratio on the electrolyte surface. The results are shown in FIG. 7. As shown in FIG. 7, the solid electrolyte material obtained in Example 1 was larger in carbon atomic ratio than the solid electrolyte materials obtained in Comparative Examples 1 to 3. Further, heptane used for synthesizing the solid electrolyte material starts to be carbonized at about 600° C. Therefore, it is considered that a carbon coating layer was formed in Example 1 in which heating was performed at 700° C., but a carbon coating layer was not formed in Comparative Example 1 in which heating was not performed and Comparative Example 2 in which heating was performed at 260° C. Further, it is considered that a carbon coating layer was not formed in Comparative Example 3 because heptane was not used.

It is to be noted that in Comparative Example 3, about 2 atomic % of carbon was detected despite the fact that heptane was not used and therefore a carbon source for a carbon coating layer was theoretically absent. The reason for this may be considered to be that a complete Ar atmosphere or a perfect vacuum could not be created during the synthesis of the solid electrolyte material so that contamination (e.g., generation of lithium carbonate) occurred due to carbon dioxide in the air. Similarly, it is considered that also in Example 1 and Comparative Examples 1 and 2, about 2 atomic % of carbon was due to the influence of contamination. Further, carbon resulting from heptane was not detected by XPS despite the fact that heptane as a carbon source for a carbon coating layer remained on the surface of the solid electrolyte material obtained in Comparative Example 1. The reason for this is considered to be that because XPS measurement was performed under high vacuum, heptane was volatilized at the time of measurement.

(Charge-Discharge Properties)

Figure 8:
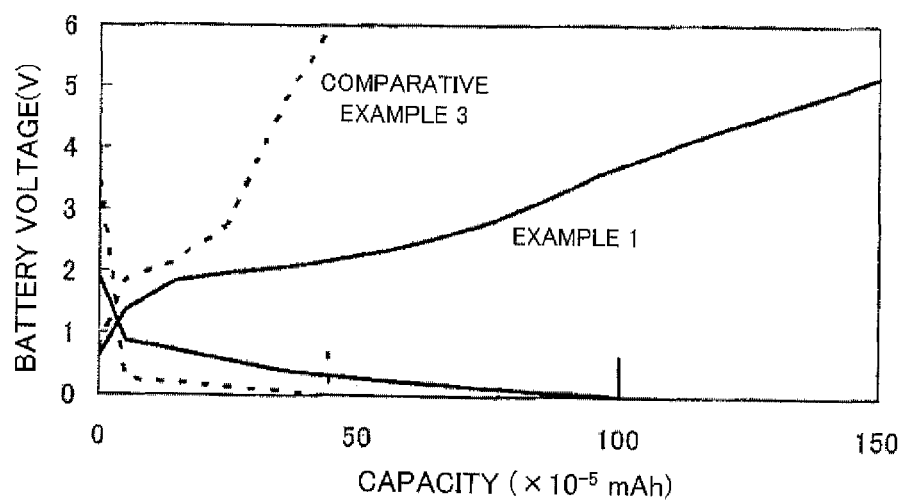
FIG. 8 is a result of charge-discharge properties of evaluation batteries using the solid electrolyte materials obtained in Example 1 and Comparative Example 3.

Evaluation batteries were prepared using the solid electrolyte materials obtained in Example 1 and Comparative Example 3, respectively. In order to evaluate the electron conductivity of the solid electrolyte material, sulfur having very low electron conductivity was used as a cathode active material. Sulfur and the solid electrolyte material were weighed in an inert gas atmosphere so that the weight ratio of sulfur:solid electrolyte material was 50:50, and were mixed in a ball mill to obtain a cathode mix (10 mg). Further, 150 mg of the 75Li$_2$S.25P$_2$S$_5$ glass obtained in Comparative Example 1 was weighed and used as a material for forming a solid electrolyte layer. Further, a Li—In alloy foil (φ10 mm, thickness: 100 μm) was used as an anode active material layer. Evaluation batteries were prepared using these materials. The obtained evaluation batteries were charged and discharged between 0 V and 10 V at a constant current of 6 μA/cm². The results are shown in FIG. 8. As shown in FIG. 8, the evaluation battery using the solid electrolyte material obtained in Example 1 was higher in discharging capacity and charging capacity as compared to the evaluation battery using the solid electrolyte material obtained in Comparative Example 3. By these results, it is suggested that the solid electrolyte material obtained in Example 1 had high electron conductivity and its Li ion conductivity was not impaired.

REFERENCE SIGNS LIST 1 solid electrolyte particle
2 carbon coating layer
2a liquid component
10 solid electrolyte material
11 cathode active material layer
12 anode active material layer
13 solid electrolyte layer
14 cathode current collector
15 anode current collector
20 solid state battery

The invention claimed is:

1. A solid electrolyte material comprising:
   a solid electrolyte particle; and
   a carbon coating layer formed on a surface of the solid electrolyte particle,
   wherein the carbon coating layer is a layer with no grain boundary, and
   a surface coverage of the solid electrolyte particle with the carbon coating layer is 40% or higher.

2. The solid electrolyte material according to claim 1, wherein the carbon coating layer is formed by carbonizing a liquid component.

3. The solid electrolyte material according to claim 1, wherein the solid electrolyte particle is a sulfide solid electrolyte particle.

4. The solid electrolyte material according to claim 1, wherein an electron conductivity of the solid electrolyte material is $1\times10^{-3}$ S/cm or higher.

5. A solid state battery comprising:
   a cathode active material layer;
   an anode active material layer; and
   a solid electrolyte layer formed between the cathode active material layer and the anode active material layer,
   wherein at least one of the cathode active material layer and the anode active material layer contains the solid electrolyte material according to claim 1.

6. A method for producing a solid electrolyte material comprising steps of:
   a preparing step of preparing a solid electrolyte particle having a liquid component on its surface; and
   a heating step of heating the solid electrolyte particle to carbonize the liquid component to form a carbon coating layer.

7. The method for producing a solid electrolyte material according to claim 6, wherein the carbon coating layer is a layer with no grain boundary.

8. The method for producing a solid electrolyte material according to claim 6, wherein a surface coverage of the solid electrolyte particle with the carbon coating layer is 40% or higher.

9. The solid electrolyte material according to claim 1, wherein a thickness of the carbon coating layer is 10 nm or more and 200 nm or less.

10. The method for producing a solid electrolyte material according to claim 6, wherein a thickness of the carbon coating layer is 10 nm or more and 200 nm or less.

* * * * *